(12) United States Patent
Chen et al.

(10) Patent No.: US 12,056,370 B2
(45) Date of Patent: *Aug. 6, 2024

(54) DATA STORAGE DEVICE, SYSTEM, AND METHOD FOR DIGITAL SIGNATURE

(71) Applicant: INNODISK CORPORATION, New Taipei (TW)

(72) Inventors: Ming-Sheng Chen, New Taipei (TW); Chin-Chung Kuo, New Taipei (TW)

(73) Assignee: INNODISK CORPORATION, New Taipe (TW)

( * ) Notice: Subject to any disclaimer, the term of this patent is extended or adjusted under 35 U.S.C. 154(b) by 85 days.

This patent is subject to a terminal disclaimer.

(21) Appl. No.: 17/503,629

(22) Filed: Oct. 18, 2021

(65) Prior Publication Data

US 2022/0244866 A1 Aug. 4, 2022

(30) Foreign Application Priority Data

Feb. 3, 2021 (TW) .................................. 110103990

(51) Int. Cl.
*G06F 3/06* (2006.01)
*H04L 9/08* (2006.01)
*H04L 9/32* (2006.01)

(52) U.S. Cl.
CPC .......... *G06F 3/0622* (2013.01); *G06F 3/0655* (2013.01); *G06F 3/0679* (2013.01); *H04L 9/0825* (2013.01); *H04L 9/3242* (2013.01); *H04L 9/3247* (2013.01)

(58) Field of Classification Search
USPC ........................................................ 711/163
See application file for complete search history.

(56) References Cited

U.S. PATENT DOCUMENTS

| 8,667,265 | B1 * | 3/2014 | Hamlet ................ | H04L 9/3278 713/185 |
|---|---|---|---|---|
| 9,397,839 | B2 * | 7/2016 | Thoniel .................. | G06F 21/00 |
| 9,860,230 | B1 * | 1/2018 | Sobel ...................... | G06F 21/33 |
| 9,893,898 | B2 * | 2/2018 | Kreft ..................... | H04L 9/0643 |
| 2006/0105748 | A1 * | 5/2006 | Ooi ........................ | G06F 21/34 455/410 |

(Continued)

FOREIGN PATENT DOCUMENTS

TW M582272 U 8/2019

*Primary Examiner* — Yaima Rigol
*Assistant Examiner* — Elias Young Kim

(57) ABSTRACT

The invention discloses a digital signature system. The digital signature system comprises an electronic device and a data storage device. The electronic device generates a specific data by executing a specific operation, and performs a calculation operation on the specific data via a hash algorithm to generate a hash data. The data storage device comprises a controller, a plurality of flash memories, and a data transmission interface. The electronic device transmits the hash data to the data storage device via the transmission interface. The controller comprises a firmware. The firmware reads an unclonable function, and generates a private key according to the unclonable function, and encrypts the hash data by the private key to obtain a digital signature. The data storage device transmits the digital signature to the electronic device via the transmission interface.

5 Claims, 3 Drawing Sheets

(56) References Cited

U.S. PATENT DOCUMENTS

| | | | |
|---|---|---|---|
| 2007/0050626 A1* | 3/2007 | Tokie | H04L 9/3236 713/176 |
| 2010/0031024 A1* | 2/2010 | Hayes | H04L 9/3263 380/42 |
| 2012/0272056 A1* | 10/2012 | Ganesan | H04L 9/3215 380/283 |
| 2013/0238903 A1* | 9/2013 | Mizunuma | G06F 21/31 713/176 |
| 2013/0268753 A1* | 10/2013 | Vanderpol | G06F 21/567 713/155 |
| 2017/0302450 A1* | 10/2017 | Ebrahimi | H04L 9/3252 |
| 2019/0342092 A1* | 11/2019 | Handschuh | H04L 9/0816 |
| 2020/0374117 A1* | 11/2020 | Wei | H04L 9/0841 |
| 2021/0173944 A1* | 6/2021 | Mastenbrook | H04L 9/30 |

* cited by examiner

DATA STORAGE DEVICE, SYSTEM, AND METHOD FOR DIGITAL SIGNATURE

This non-provisional application claims priority claim under 35 U.S.C. § 119(a) on Taiwan Patent Application No. 110103990 filed Feb. 3, 2021, the entire contents of which are incorporated herein by reference.

FIELD OF THE INVENTION

The present invention is related to a data storage device, particularly to a data storage device capable digitally signing data generated by an electronic device executing a specific operation, BACKGROUND With the advancement of technology and the popularity of the Internet, digital information is flooding our lives. Since digital information is easy to be transmitted and copied, in order to improve the security and reliability of digital information, data will be encrypted when transferring data.

Encryption algorithms usually have symmetric encryption algorithm and asymmetric encryption algorithm. Wherein the symmetric encryption algorithm uses the same key to encrypt data, and decrypt data. When the encrypted data is transmitting, the key must also be transmitted, so that the data recipient can decrypt the encrypted data via the received key. However, in the process of transmitting the key, the key may also be intercepted by the cyber hacker, so that the data content can also be easily learned and tampered by the cyber hacker. Therefore, the digital information protected by the use of the symmetric encryption algorithm is relatively insecure.

The asymmetric encryption algorithm can generate a pair asymmetric keys, for example, a private key and a public key. The public key is a key that can be disclosed to others, and the private key is a key that the user keeps and cannot be disclosed. The public key is used to encrypt data, and the private key is used to decrypt the data encrypted. Otherwise, the private key is used to encrypt data, and the public key is used to decrypt the data encrypted. It does not need to transmit the key when the digital information is protected by the use of the asymmetric encryption algorithm, even if the encrypted data is intercepted by the cyber hacker in the middle, the cyber hacker cannot easily decrypt or tamper with the encrypted data content. Therefore, the digital information protected by the use of the symmetric encryption algorithm is relatively secure.

Furthermore, the asymmetric encryption algorithm is usually stored in a data storage device of a computer device in a form of software, or configured in a security chip of a computer device in a form of firmware. A processor or the security chip randomly generates a private key and a public key corresponding to the private key. The private key and the public key are respectively a string of random passwords, and the private key is usually stored in a data storage device. If the private key stored in the data storage device is accidentally deleted or lost, the encrypted data will be unable to be decrypted such a way that the approach will increase the chance of the private key being stolen, thereby reducing the security of data transmission.

SUMMARY

It is one objective of the present invention to provide a digital signature system, which comprises an electronic device and a data storage device. The electronic device is a device capable of operating a specific operation to generate a specific data. The data storage device is a device capable of digitally signing data. The electronic device or the data storage device performs a calculation operation on the specific data by the hash algorithm to obtain a hash data. The data storage device performs a digital signature operation for the hash data so that the specific data generated by the electronic device and the hash data corresponding to the specific data can be protected by the digital signature.

It is another objective of the present invention to provide a digital signature system, wherein the data storage device of the digital signature system comprises a controller, a plurality of flash memories, and a data transmission interface. The data storage device is connected to the electronic device via the data transmission interface. When the data storage device executes the digital signature operation, the data storage device reads an unclonable function, generates a private key according to the unclonable function, converts the private key into a corresponding public key by an asymmetric encryption algorithm, encrypt the specific data and the hash data to generate a digital signature, and transmits the public key and the digital signature to the electronic device, in such a way that the digital signature operation can be completed.

It is another objective of the present invention to provide a digital signature system, wherein when the electronic device receives the public key and the digital signature, the electronic device transmits the public key to the notary authority, and registers the public key to the notary authority so as to bind the public key with the data storage device. The electronic device uploads the specific data and the digital signature to a cloud or a data verification unit. When the cloud or the data verification unit receives the specific data and the digital signature, the cloud or the data verification unit will perform a data verification procedure. In the data verification procedure, the cloud or the data verification unit obtains the public key bound with the data storage device, and decrypts the digital signature by the public key to obtain the first hash data. The cloud or the data verification unit performs a calculation operation on the specific data by the hash algorithm to obtain a second hash data, and then compares whether the second hash data is equal to the first hash data. If the second hash data is equal to the first hash data, the specific data is an original data that does not tampered with. On the contrary, if the second hash data is not equal to the first hash data the specific data is a data that has been tampered with. Thus, by the execution of the data verification procedure, the cloud or the data verification unit can verify whether the specific data is provided by a trusted electronic device.

To achieve the above objective, the present invention provides a data storage device for digital signature, comprising: a controller, comprising a firmware having a private key; a plurality of flash memories; and a data transmission interface, wherein the controller is connected to the data transmission interface and the flash memories, and the data storage device is connected to an electronic device via the data transmission interface; wherein the electronic device executes a specific operation to generate a specific data, and performs a calculation operation on the specific data by a hash algorithm to obtain a first hash data; wherein the data storage device receives the first hash data from the electronic device via the data transmission interface; then, the firmware of the controller encrypts the first hash data by the private key to generate a digital signature, and the data storage device transmits the digital signature to the electronic device via the data transmission interface.

In one embodiment of the present invention, wherein the firmware reads an unclonable function, and generates the private key according to the unclonable function.

In one embodiment of the present invention, wherein the firmware of the controller converts the private key to a corresponding public key by an asymmetric encryption algorithm, and the data storage device transmits the public key to the electronic device via the data transmission interface.

The present invention further provides a data storage device for digital signature, comprising: a controller, comprising a firmware having a private key; a plurality of flash memories; and a data transmission interface, wherein the controller is connected to the data transmission interface and the flash memories, and the data storage device is connected to an electronic device via the data transmission interface; wherein the electronic device executes a specific operation to generate a specific data; wherein the data storage device receives the specific data from the electronic device via the data transmission interface, the firmware of the controller performs a calculation operation on the specific data by a hash algorithm to obtain a first hash data, and encrypts the first hash data by the private key to generate a digital signature; then, the data storage device transmits the digital signature to the electronic device via the data transmission interface.

In one embodiment of the present invention, wherein the firmware reads an unclonable function, and generates the private key according to the unclonable function.

The present invention further provides a digital signature system, comprising: an electronic device, used to execute a specific operation to generate a specific data, and performs a calculation operation on the specific data by a hash algorithm to obtain a first hash data; and a data storage device, comprising: a controller, comprising a firmware having a private key; a plurality of flash memories; and a data transmission interface, wherein the controller is connected to the data transmission interface and the flash memories, and the data storage device is connected to the electronic device via the data transmission interface; wherein the electronic device transmits the first hash data to the data storage device; wherein the data storage device receives the first hash data from the electronic device via the data transmission interface; then, the firmware of the controller encrypts the first hash data by the private key to generate a digital signature, and the data storage device transmits the digital signature to the electronic device via the data transmission interface.

In one embodiment of the present invention, wherein the electronic device is a device capable of connecting network, the electronic device is connected to a blockchain, and transmits the specific data and the digital signature to the blockchain so as to chain the specific data and the digital signature into the blockchain.

In one embodiment of the present invention, wherein the electronic device is a device capable of connecting network, the electronic device transmits the public key to a notary authority, and registers the public key to the notary authority so as to bind the public key with the data storage device.

In one embodiment of the present invention, wherein the digital signature system comprises a cloud or a data verification unit, the electronic device is network connected to the cloud or a data verification unit, the electronic device transmits the specific data and the digital signature to the cloud or the data verification unit; after the cloud or the data verification unit receives the specific data and the digital signature, the cloud or the data verification unit obtains the public key, the cloud or the data verification unit decrypts the digital signature by the public key to obtain the first hash data, executes a hash algorithm to the specific data to generate a second hash data, and compares whether the second hash data is equal to the first hash data to verify an authenticity of the specific data.

The present invention further provides a digital signature system, comprising: an electronic device, used to execute a specific operation to generate a specific data; and a data storage device, comprising: a controller, comprising a firmware having a private key; a plurality of flash memories; and a data transmission interface, wherein the controller is connected to the data transmission interface and the flash memories, and the data storage device is connected to the electronic device via the data transmission interface; wherein the electronic device transmits the specific data to the data storage device; wherein the firmware of the controller performs a calculation operation on the specific data by a hash algorithm to obtain a first hash data, encrypts the first hash data by the private key to generate a digital signature, and the data storage device transmits the digital signature to the electronic device via the data transmission interface.

The present invention further provides a digital signature method, which is applied to a digital signature system, the digital signature system comprises an electronic device and a data storage device; the electronic device executes a specific operation to generate a specific data, and performs a calculation operation on the specific data by a hash algorithm to obtain a first hash data; the data storage device comprises a controller, a plurality of flash memories, and a data transmission interface; the controller comprises a firmware; the digital signature method executed by the firmware comprising: generating a private key; receiving the first hash data from the electronic device via the data transmission interface; encrypting the first hash data by the private key to generate a digital signature, and transmitting the digital signature to the electronic device.

The present invention further provides a digital signature method, which is applied to a digital signature system, the digital signature system comprises an electronic device and a data storage device; the electronic device executes a specific operation to generate a specific data; the data storage device comprises a controller, a plurality of flash memories, and a data transmission interface; the controller comprises a firmware; the digital signature method executed by the firmware comprising: generating a private key; receiving the specific data from the electronic device via the data transmission interface; performing a calculation operation on the specific data by a hash algorithm to obtain a first hash data; encrypting the first hash data by the private key to generate a digital signature, and transmitting the digital signature to the electronic device.

DETAILED DESCRIPTION OF THE PREFERRED EMBODIMENTS

Figure 1:
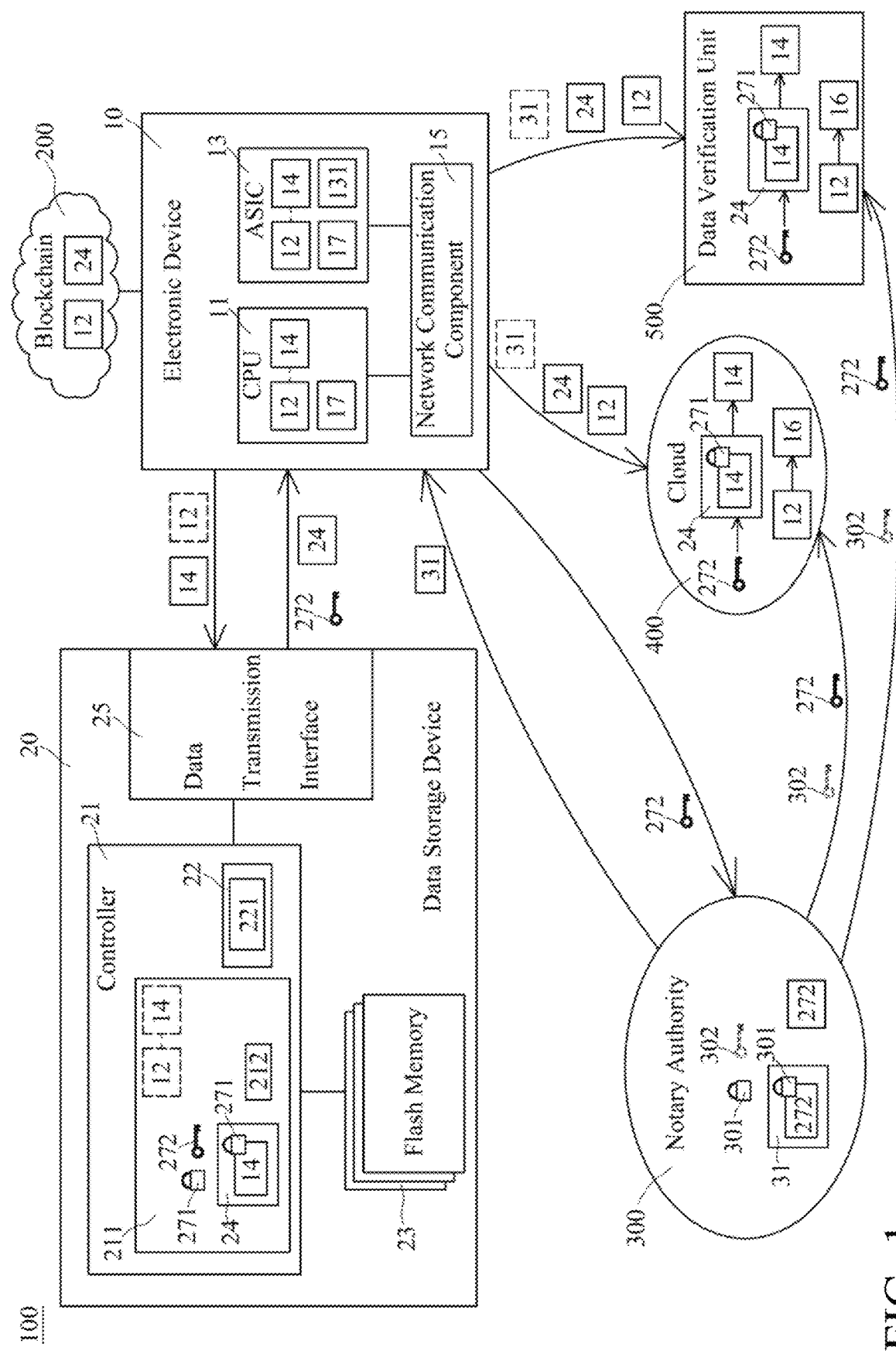
FIG. 1 is a schematic diagram of a digital signature system of the present invention.

Referring to FIG. 1, there is shown a schematic diagram of a digital signature system of the present invention. As shown in FIG. 1, the digital signature system 100 comprises an electronic device 10 and a data storage device 20. The electronic device 10 is a device capable of executing a specific operation. For example, the electronic device 10 is computer host, communication device or Internet of Things equipment. The electronic device 10 comprises a processor 11 or an application specific integrated circuit (ASIC) 13. The electronic device 10 generates a specific data 12 by performing a specific operation through the processor 11 in a form of software. The electronic device 10 generates a specific data 12 by performing a specific operation through the ASIC 13 in a form of hardware. The data storage device 20 is a device capable digitally signing data. The data storage device 20 can execute a digital signature operation to the specific data 12 generated by the electronic device 10. Or, the data storage device 20 can execute the digital signature operation to a hash data generated by performing a calculation operation on the specific data 12 by a hash algorithm. So, the specific data 12 or the hash data corresponding to the specific data 12 can be can be protected by digital signature. The electronic device 10 further comprises a network communication component 15. The electronic device 10 is connected to Internet via the network communication component 15.

The data storage device 20 is a solid state disk (SSD). The data storage device 20 is an external device independent of the electronic device 10. Or, the data storage device 20 is disposed inside the electronic device 10, and as a storage medium of the electronic device 10. The data storage device 20 includes a controller 21, a plurality of flash memories 23, and a data transmission interface 25, respectively. The controller 21 is connected to the flash memories 23 and the data transmission interface 25. The data transmission interface 25 is an interface conforming to SATA, PCIe, USB, or other data standard specifications. The data transmission interface 25 is an interface compliant with SATA, PCIe, USB or other data standard specifications. The data storage device 20 is plugged into a connector (such as such as a SATA, PCIe, or USB connector) of the electronic device 10 via the data transmission interface 25. The data can be transmitted between the data storage device 20 and the electronic device 10 via the data transmission interface 25.

The controller 21 comprises a firmware 211. The firmware 211 defines a digital signature operation procedure 212. The execution of the digital signature operation procedure 212 can be controlled by a software (such as application program) or a hardware (such as physical control key).

The firmware 211 is having a private key 271 generated according to an unclonable function 221. In one embodiment of the present invention, the controller 211 comprises a volatile memory (such as SRAM). The unclonable function 221 is an initial state of the volatile memory 22 when it is powered on. In another embodiment of the present invention, the unclonable function 221 is a biological characteristic (for example, fingerprint, vein texture, face or iris) captured by a biological characteristic capture module (it is not shown). The biological characteristic capture module is disposed in the data storage device 20, or is an external device independent of the data storage device 20. The firmware 211 reads the biological characteristic via the biological characteristic capture module, and generates the private key 271 according to the biological characteristic. Since the unclonable function 221 of the physical characteristic (such as the initial state of the volatile memory 22 when it is powered on) or the unclonable function 221 of the biological characteristic (such as fingerprint, vein texture, face, or iris) is unique, the data storage device 20 can generate the same private key 271 at any time according to the unclonable function 221 of the physical characteristic or the biological characteristic so that the private key 271 is not necessary to be stored. The risk of copying and leaking the private key 271 can be reduced because the private key 271 is not necessary to be stored so that the security of the digital signature can be improved.

Another embodiment of the present embodiment, the controller 21 further comprises a key storage area (it is not shown). The key storage area is a read-only memory (ROM). The private key 271 is burned in the key storage area pass through an encryption operation. For example, the private key 271 is encrypted by AES, DES, or other encryption algorithm, and the firmware 211 burns the encrypted private key 271 into the key storage area. Afterwards, the firmware 211 can take out the encrypted private key 271 from the key storage area, and decrypt the encrypted private key 271 by the encryption algorithm to obtain the private key 271 decrypted. Thus, the private key 271 is encrypted, and stored in ROM, in such a way that can avoid the risk of the private key 271 tampered with and leaked.

After obtaining the private key 271, the firmware 21 further converts the private key 271 to a corresponding to public key 272 by an asymmetric encryption algorithm. The asymmetric encryption algorithm is an elliptic curve algorithm or an RSA encryption algorithm. The data storage device 20 transmits the public key 272 to the electronic device 10 via the data storage interface 25. After receiving the public key 272, the electronic device 10 further transmits the public key 272 to a notary authority, and registers the public key 272 to the notary authority so as to bind the public key 272 with the data storage device 20.

As the above description, after the electronic device 10 executes the specific operation, it will generate the specific data 12. A hash algorithm will be executed by the electronic device 10 or the data storage device 20 to the specific data 12 so as to obtain a first hash data 14 corresponding to the specific data 12. In one embodiment of the present invention, if the hash algorithm is executed by the electronic device 10, it will execute the hash algorithm to the specific data 12 via a processor 11 or a special application chip 13 so as to obtain the first hash data 14, and then transmit the first hash data 14 to the data storage device 20. Otherwise, in another embodiment of the present invention, if the hash algorithm is executed by the data storage device 20, the electronic device 10 transmits the specific data 12 to the data storage device 20, and then the data storage device 20 executes the hash algorithm to the specific data 12 via the firmware 211 of the controller 21 so as to obtain the first hash data 14. After obtaining the first hash data 14 corresponding to the specific data 12, the firmware 211 encrypts the first hash data 14 via the private key 271 to generate a digital signature 24, and transmits the digital signature 24 to the electronic device 10 via the data transmission interface 25, so as to complete the digital signature procedure.

After receiving the digital signature 24, the user of the electronic device 10 uploads the specific data 12 and the digital signature 24 to a cloud 400, or sends the specific data 12 and the digital signature 24 to a data verification unit 500. When the cloud 400 or the data verification unit 500 receives the specific data 12 and the digital signature 24, a data verification procedure can be performed in order to verify the authenticity of the specific data 12.

In the data verification procedure, the cloud 400 or the data verification unit 500 obtains the public key 272 bound with the data storage device 20, and decrypt the digital signature 24 by the public key 272 to obtain the first hash data 14. The cloud 400 or the data verification unit 500 performs a calculation operation on the specific data 12 by the hash algorithm again to obtain a second hash data 16, and then compares whether the second hash data 16 is equal to the first hash data 14. If the second hash data 16 is equal to the first hash data 14, the specific data 12 is an original data that does not tampered with. On the contrary, if the second hash data 16 is not equal to the first hash data 14, the specific data 12 is a data that has been tampered with. Thus, by the execution of the data verification procedure, the cloud 400 or the data verification unit 500 can verify whether the specific data 12 is provided by a trusted electronic device 10. In the present invention, the cloud 400 can also be a network server, a remote computer, or a remote communication device, and the data verification unit 500 is a unit configured with data computing device (such as a computer device).

In another embodiment of the present invention, for improving the credibility of the public key 272, the electronic device 10 transmits the public key 272 bound with the electronic device 10 to the notary authority 300, and submits an application for an electronic certificate 31 to notary authority 300. The notary authority 300 encrypts the public key 272 to generate an electronic certificate 31, and transmits the electronic certificate 31 to the electronic device 10. Afterwards, the electronic device 10 uploads the electronic certificate 31, the digital signature 24, and the specific data 12 to the cloud 400, or delivers the electronic certificate 31, the digital signature 24, and the specific data 12 to the data verification unit 500. After receiving the electronic certificate 31, the digital signature 24, and the specific data 12, the cloud 400 or the data verification unit 500 can execute a data verification procedure. In the data verification procedure, the cloud 400 or the data verification unit 500 obtains a public key 302 of the notary authority 300 from the notary authority 300. The cloud 400 or the data verification unit 500 decrypts the electronic certificate 31 to obtain the public key 272 bound with the electronic device 10. The cloud 400 or the data verification unit 500 decrypts the digital signature 24 to obtain the first hash data 14 by the public key 272. The cloud 400 or the data verification unit 500 performs the calculation operation on the specific data 12 by the hash algorithm again to obtain a second hash data 16. Then, the cloud 400 or the data verification unit 500 compares whether the second hash data 16 is equal to the first hash data 14. If the second hash data 16 is equal to the first hash data 14, the specific data 12 is an original data that does not tampered with. On the contrary, if the second hash data 16 is not equal to the first hash data 14, the specific data 12 is a data that has been tampered with.

In an application embodiment of the present invention, the electronic device 10 is a device that can produce an electronic certificate (such as a graduation certificate, a skill verification certificate, a patent certificate, etc.). The electronic device 10 can execute an operation of producing the electronic certificate by an electronic certificate production software, and then generate a specific data 12 related with the electronic certificate. The processor 11 of the electronic device 10 or the firmware 211 of the data storage device 20 performs a calculation operation on the specific data 12 by the hash algorithm to obtain the first hash data 14 corresponding to the specific data 12. The firmware 211 of the data storage device 20 encrypts the first hash data 14 by the private key 271 to generate the digital signature 24. The data storage device 20 transmits the digital signature 24 to the electronic device 10 via the data transmission interface 25. The electronic device 10 transmits the digital signature 24 and the specific data 12 related with the electronic certificate to the data verification unit 500, such as human resources (HR) department. When the data verification unit 500 receives the specific data 12 and the digital signature 24, it will obtain the public key 272 bound with the electronic device 10 from the notary authority 300, and decrypt the digital signature 24 by the public key 272 to obtain the first hash data 14. Besides, the data verification unit 500 performs the calculation operation on the specific data 12 by the hash algorithm again to obtain a second hash data 16, and then compares whether the second hash data 16 is equal to the first hash data 14. If the second hash data 16 is equal to the first hash data 14, the specific data 12 related with the electronic certificate is a data that does not tampered with, and it is trustworthy. On the contrary, if the second hash data 16 is not equal to the first hash data 14, the specific data 12 related with the electronic certificate is a counterfeit data.

In another application embodiment of the present invention, the electronic device 10 is a device capable of performing an online transaction processing (such as shopping transaction processing or securities transaction processing). The electronic device 10 can execute an online transaction operation by an online transaction application program, and then generate a specific data 12 related with the online transaction processing. The processor 11 of the electronic device 10 or the firmware 211 of the data storage device 20 performs a calculation operation on the specific data 12 by the hash algorithm to obtain the first hash data 14 corresponding to the specific data 12. The firmware 211 of the, data storage device 20 encrypts the first hash data 14 by the private key 271 to generate the digital signature 24. The data storage device 20 transmits the digital signature 24 to the electronic device 10 via the data transmission interface 25. The electronic device 10 transmits the digital signature 24 and the specific data 12 related with the online transaction processing to the cloud 400, such as online transaction center. When the cloud 400 receives the specific data 12 and the digital signature 24, it will obtain the public key 272 bound with the electronic device 10 from the notary authority 300, and decrypt the digital signature 24 by the public key 272 to obtain the first hash data 14. Besides, the cloud 400 performs the calculation operation on the specific data 12 by the hash algorithm again to obtain the second hash data 16, and then compares whether the second hash data 16 is equal to the first hash data 14. If the second hash data 16 is equal to the first hash data 14, the specific data 12 related with the online transaction processing is a data that does not tampered with, the cloud 400 executes an online transaction process according to the specific data 12. On the contrary, if the second hash data 16 is not equal to the first hash data 14, the specific data 12 related with the online transaction processing is a counterfeit data, the cloud 400 prohibits the execution of the online transaction process.

Of course, in the above application embodiment, the electronic device 10 can also further submit the application for the electronic certificate 31 to the notary authority 300 when the electronic device 10 transmits the public key 272 to the notary authority 300, so as to increase the credibility of the public key 272. Furthermore, the digital signature system 100 of the present invention is not only applied to digital signatures for electronic certificates or data related with the online transaction processing, but also can be applied to other purposes that require data protection.

Another embodiment of the present invention, the electronic device 10 may also directly transmit the public key 272 to the cloud 400 or the data verification unit 500. Thus, the cloud 400 or the data verification unit 500 can directly decrypt the digital signature 24 by the public key 272 transmitted from the electronic device 10 to obtain the first hash data 14.

The electronic device 10 is connected to a blockchain 200 via the network communication component 15. The electronic device 10 further comprises a data chaining program 17. The data chaining program 17 is configured in the processor 11 and the specific application chip 13 in the form of firmware, and executed by the microprocessor 13 or the controller 111. Otherwise, the specific application chip 13 comprises an embedded system 131; the data chaining program 17 is installed in the embedded system 131, and executed by the embedded system 131. The electronic device 10 transmits the specific data 12 and/or the digital signature 24 to the blockchain 200 to chain the specific data 12 and/or the digital signature 24 into the blockchain 200. Accordingly, the specific data 12 and/or the digital signature 24 can be protected in the blockchain 200 according to the characteristics that the blockchain data cannot be tampered and forged to increase the security of specific data 12 and/or digital signature 24 in applications.

Figure 2:
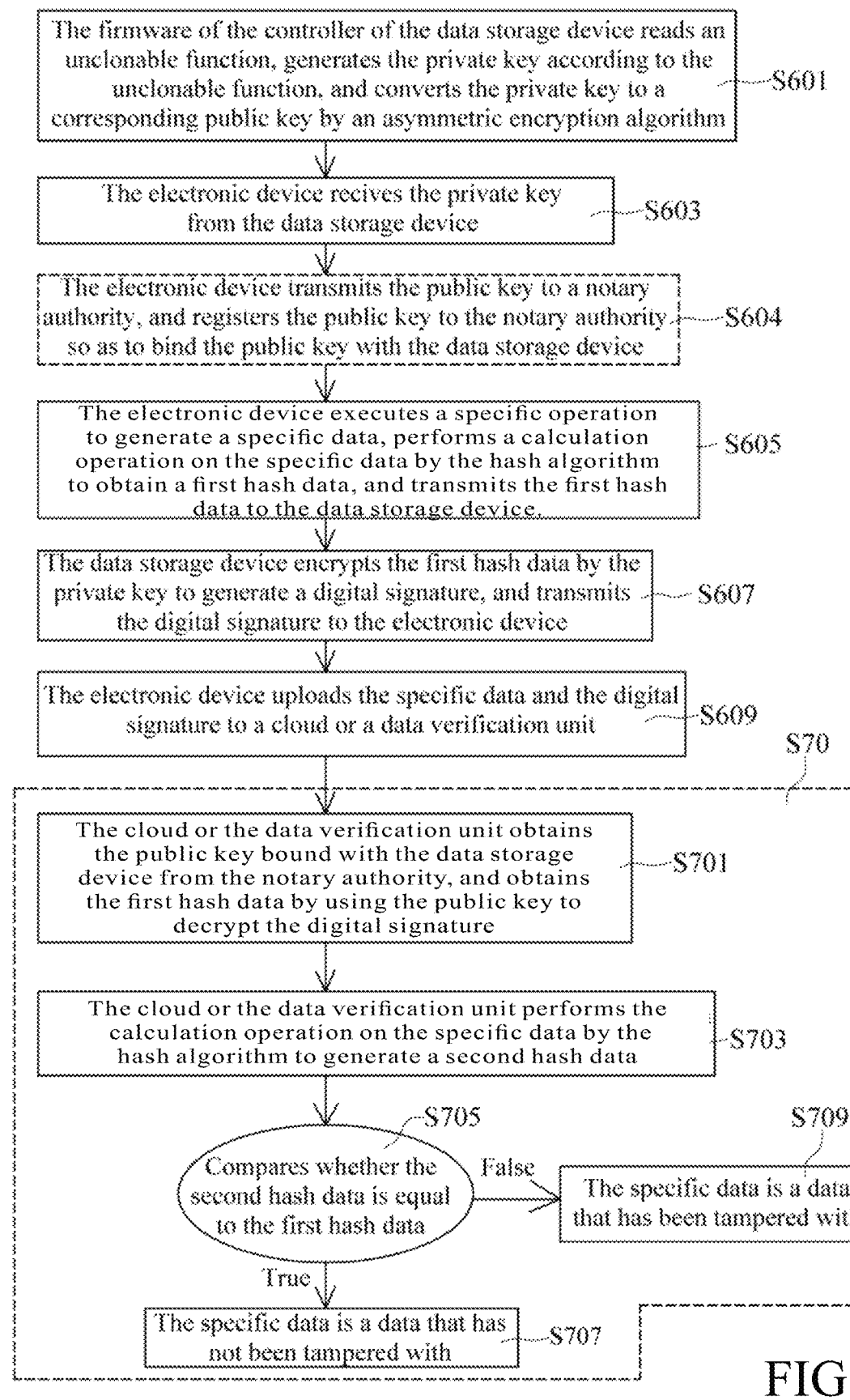
FIG. 2 is a flow chart of a digital signature method according to one embodiment of the present invention.

Referring to FIG. 2, there is shown a flow chart of a digital signature method according to one embodiment of the present invention, and referring to FIG. 1 together. Firstly, in step of S601, the firmware 211 of the controller 21 of the data storage device 20 reads an unclonable function 221, generates a private key 271 according to the unclonable function 221, and converts the private key 271 to a corresponding to public key 272 by an asymmetric encryption algorithm. In step of S603, the electronic device 10 receives the public key 272 from the data storage device 20. In step of S605, the processor 11 or the special application chip 13 of the electronic device 10 executes a specific operation to generate a specific data 12, performs a calculation operation on the specific data 12 by the hash algorithm to obtain a first hash data 14, and transmits the first hash data 14 to the data storage device 20. In step of S607, after receiving the first hash data 14, the data storage device 20 encrypts the first hash data 14 via the private key 271 to generate a digital signature 24, and transmits the digital signature 24 to the electronic device 10 via the data transmission interface 25, so as to complete the digital signature procedure. In one embodiment of the present invention, in step of S603, after the electronic device 10 receives the public key 272 from the data storage device 20, continuing to execute step of S604, the electronic device 10 transmits the public key 272 to the notary authority 300, and registers the public key 272 to the notary authority so as to bind the public key 272 with the data storage device 20.

Sequentially, in step of S609, the electronic device 10 uploads the specific data 12 and the digital signature 24 to a cloud 400 or a data verification unit 500. The cloud 400 or the data verification unit 500 executes a data verification procedure S70. In step of S701 of the data verification procedure S70, the cloud 400 or the data verification unit 500 obtains the public key 272 bound with the data storage device 20 from the electronic device 10 or the notary authority 300, and decrypt the digital signature 24 by the public key 272 to obtain the first hash data 14. In step of S703, the cloud 400 or the data verification unit 500 performs a calculation operation on the specific data 12 by the hash algorithm to obtain a second hash data 16. In step of S705, the cloud 400 or the data verification unit 500 compares whether the second hash data 16 is equal to the first hash data 14. In step of S707, if the cloud 400 or the data verification unit 500 determines that the second hash data 16 is equal to the first hash data 14, the specific data 12 is an original data that does not tampered with. On the contrary, in step of S709, if the cloud 400 or the data verification unit 500 determines that the second hash data 16 is not equal to the first hash data 14, the specific data 12 is a data that has been tampered with.

Figure 3:
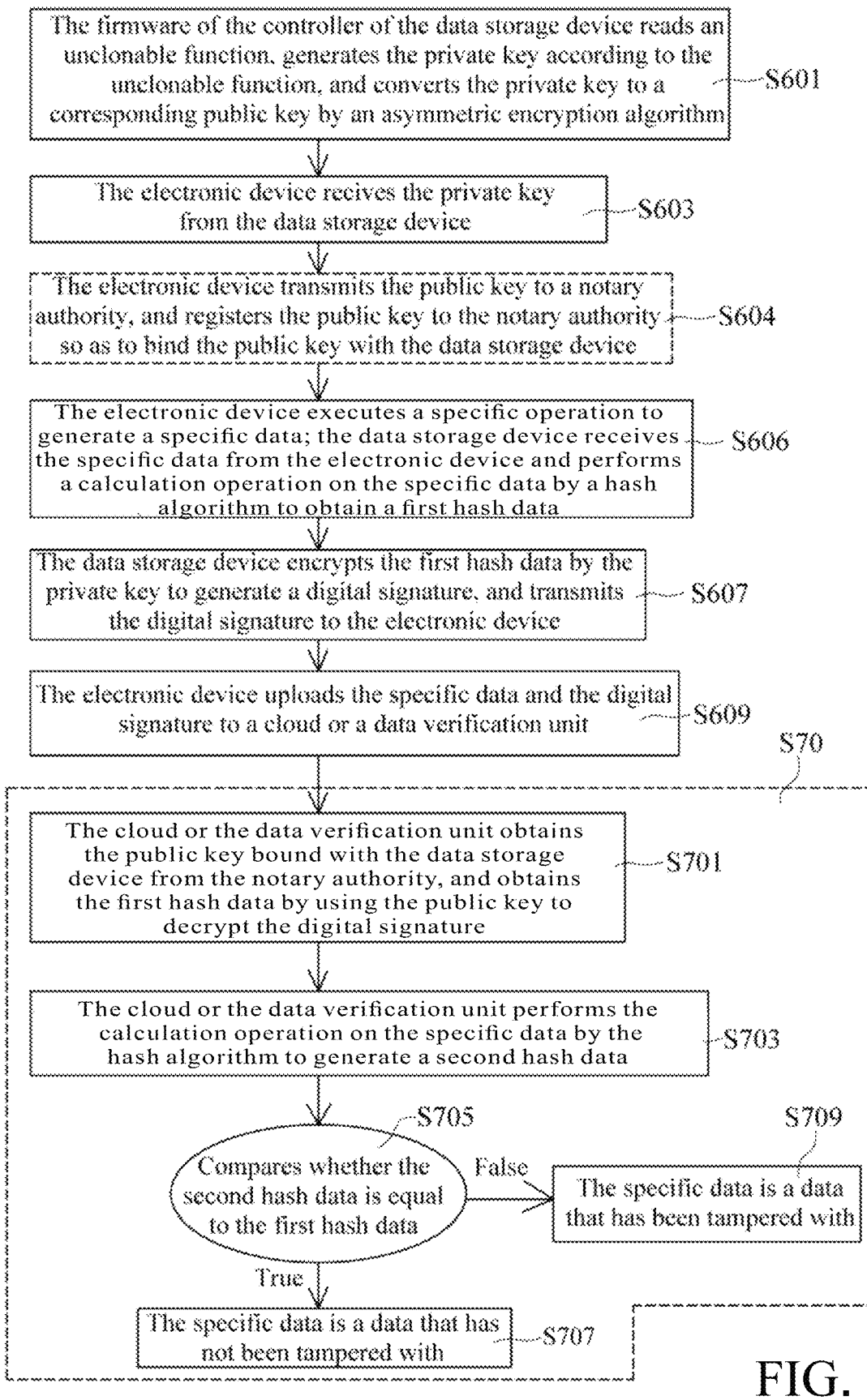
FIG. 3 is a flow chart of a digital signature method according to another embodiment of the present invention.

Referring to FIG. 3, there is shown a flow chart of a digital signature method according to another embodiment of the present invention, and referring to FIG. 1 together. In step of S601, the firmware 211 of the controller 21 of the data storage device 20 reads an unclonable function 221, generates a private key 271 according to the unclonable function 221, and converts the private key 271 to a corresponding to public key 272 by an asymmetric encryption algorithm. In step of S603, the electronic device 10 receives the public key 272 from the data storage device 20. In step of S606, the processor 11 or the specific application chip 13 of the electronic device 10 executes a specific operation to generate a specific data 12; the data storage device 20 receives the specific data 12 from the electronic device 10, and performs a calculation operation on the specific data 12 by a hash algorithm to obtain a first hash data 14. In step of S607, after receiving the first hash data 14, the data storage device 20 encrypts the first hash data 14 via the private key 271 to generate a digital signature 24, and transmits the digital signature 24 to the electronic device 10 via the data transmission interface 25, so as to complete the digital signature procedure. In one embodiment of the present invention, in step of S603, after the electronic device 10 receives the public key 272 from the data storage device 20, continuing to execute step of S604, the electronic device 10 transmits the public key 272 to the notary authority 300, and registers the public key 272 to the notary authority so as to bind the public key 272 with the data storage device 20.

Sequentially, in step of S609, the electronic device 10 uploads the specific data 12 and the digital signature 24 to a cloud 400 or a data verification unit 500. The cloud 400 or the data verification unit 500 executes a data verification procedure S70. In step of S701 of the data verification procedure S70, the cloud 400 or the data verification unit 500 obtains the public key 272 bound with the data storage device 20 from the electronic device 10 or the notary authority 300, and decrypt the digital signature 24 by the public key 272 to obtain the first hash data 14. In step of S703, the cloud 400 or the data verification unit 500 performs the calculation operation on the specific data 12 by the hash algorithm to obtain a second hash data 16. In step of S705, the cloud 400 or the data verification unit 500 compares whether the second hash data 16 is equal to the first hash data 14. In step of S707, if the cloud 400 or the data verification unit 500 determines that the second hash data 16 is equal to the first hash data 14, the specific data 12 is an original data that does not tampered with. On the contrary, in step of S709, if the cloud 400 or the data verification unit 500 determines that the second hash data 16 is not equal to the first hash data 14, the specific data 12 is a data that has been tampered with.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:
1. A digital signature system, comprising:
an electronic device comprising a processor; and
a data storage device, comprising:

a controller comprising a volatile memory and a firmware having a private key generated;
a plurality of flash memories; and
a data transmission interface, wherein the controller is connected to the data transmission interface and the flash memories, and the data storage device is connected to the electronic device via the data transmission interface;
wherein the data storage device is configured to execute the firmware to perform digital signature generation, the firmware executed by the controller reads an unclonable function, and generates the private key according to the unclonable function, wherein the unclonable function is an initial state of the volatile memory when the volatile memory is powered on;
wherein the data storage device transmits a corresponding public key related to the private key to the electronic device via the data transmission interface;
wherein after the electronic device receives the corresponding public key, the corresponding public key is used for binding of the public key with the data storage device; after the binding of the public key with the data storage device, in response to that the processor of the electronic device executes an application to perform an operation which generates a specific data that needs to be protected by a digital signature, the electronic device performs a calculation operation on the specific data by a hash algorithm to obtain a first hash data and transmits the first hash data to the data storage device;
wherein the data storage device receives the first hash data from the electronic device via the data transmission interface; then, the firmware executed by the controller encrypts the first hash data by the private key to generate the digital signature, and the data storage device transmits the digital signature to the electronic device via the data transmission interface;
wherein the firmware executed by the controller of the data storage device converts the private key to the corresponding public key by an asymmetric encryption algorithm;
wherein the electronic device is a device which connects to network, the electronic device transmits the public key to a notary authority, and registers the public key to the notary authority so as to bind the public key with the data storage device;
wherein the digital signature system comprises a cloud or a data verification unit, the electronic device is network connected to the cloud or the data verification unit, the electronic device transmits the specific data and the digital signature to the cloud or the data verification unit; after the cloud or the data verification unit receives the specific data and the digital signature, the cloud or the data verification unit obtains the public key from the notary authority, the cloud or the data verification unit decrypts the digital signature by the public key to obtain the first hash data, performs the calculation operation on the specific data by the hash algorithm again to generate a second hash data, and compares whether the second hash data is equal to the first hash data to verify an authenticity of the specific data.

2. The digital signature system according to claim 1, wherein the electronic device is a device which connects to network, the electronic device is connected to a blockchain, and transmits the specific data and the digital signature to the blockchain so as to chain the specific data and the digital signature into the blockchain.

3. The digital signature system according to claim 1, wherein the application executed by the electronic device is an electronic certificate production program, and the specific data is related with an electronic certificate produced by using the electronic certificate production program.

4. The digital signature system according to claim 1, wherein the application executed by the electronic device is an online transaction application program, and the specific data is related with online transaction by using the online transaction application program.

5. A digital signature method, which is applied to a digital signature system, the digital signature system comprises an electronic device and a data storage device; the data storage device comprises a controller, a plurality of flash memories, and a data transmission interface; the controller comprises a firmware and a volatile memory; the digital signature method executed by the firmware comprising:
generating a private key;
transmitting a corresponding public key related to the private key to the electronic device via the data transmission interface, wherein after the electronic device receives the corresponding public key, the corresponding public key is used for binding of the public key with the data storage device; after the binding of the public key with the data storage device, in response to that a processor of the electronic device executes an application to perform an operation which generates a specific data that needs to be protected by a digital signature, the electronic device performs a calculation operation on the specific data by a hash algorithm to obtain a first hash data and transmits the first hash data to the data storage device;
receiving the first hash data from the electronic device via the data transmission interface;
encrypting the first hash data by the private key to generate the digital signature, and
transmitting the digital signature to the electronic device;
wherein generating the private key further comprises:
reading an unclonable function, wherein the unclonable function is an initial state of the volatile memory when the volatile memory is powered on; and
generating the private key according to the unclonable function;
wherein the digital signature method executed by the firmware further comprising:
converting the private key to the corresponding public key by an asymmetric encryption algorithm;
wherein the electronic device transmits the public key to a notary authority, and registers the public key to the notary authority so as to bind the public key with the data storage device; the digital signature system further comprises a cloud or a data verification unit, the electronic device is network connected to the cloud or the data verification unit, the cloud or the data verification unit executes a data verification procedure, the data verification procedure comprising:
receiving the specific data and the digital signature from the electronic device;
obtaining the public key bound with the data storage device from the notary authority;
obtaining the first hash data by decrypting the digital signature by the public key;
performing the calculation operation on the specific data by the hash algorithm to generate a second hash data again; and comparing whether the second hash data is equal to the first hash data to verify an authenticity of the specific data.

\* \* \* \* \*